United States Patent [19]

Jespersen

[11] 3,965,657
[45] June 29, 1976

[54] REAR SAFETY BUMPER FOR RIDER MOWERS

[75] Inventor: Herbert A. Jespersen, Galesburg, Ill.

[73] Assignee: Outboard Marine Corporation, Waukegan, Ill.

[22] Filed: Apr. 15, 1974

[21] Appl. No.: 460,779

[52] U.S. Cl. .................................. 56/10.2; 180/91
[51] Int. Cl.² ..................................... A01D 35/26
[58] Field of Search............. 56/10.2, 10.4, DIG. 15, 56/13.5, 14.7; 180/91, 92; 293/2

[56] References Cited
UNITED STATES PATENTS

| | | | |
|---|---|---|---|
| 2,729,299 | 1/1956 | Rink | 180/91 |
| 3,229,452 | 1/1966 | Hasenbank | 56/DIG. 15 |
| 3,590,564 | 7/1971 | Clifford | 56/10.2 |

Primary Examiner—J.N. Eskovitz
Attorney, Agent, or Firm—Michael, Best & Friedrich

[57] ABSTRACT

Disclosed herein is a riding lawn mower including a bumper movably supported on the lawn mower frame rearwardly of the rear wheels for movement between an extended position and a retracted position, together with power transmission means connecting an engine to a rotary component and including a member movable relative to a first position permitting engagement of the transmission and to a second position preventing engagement of the transmission, and means connecting the bumper to the member so as to locate the member in the first position permitting engagement of the transmission when the bumper is in the extended position and in the second position to prevent engagement of the transmission when the bumper is in the retracted position.

6 Claims, 3 Drawing Figures

U.S. Patent  June 29, 1976  3,965,657
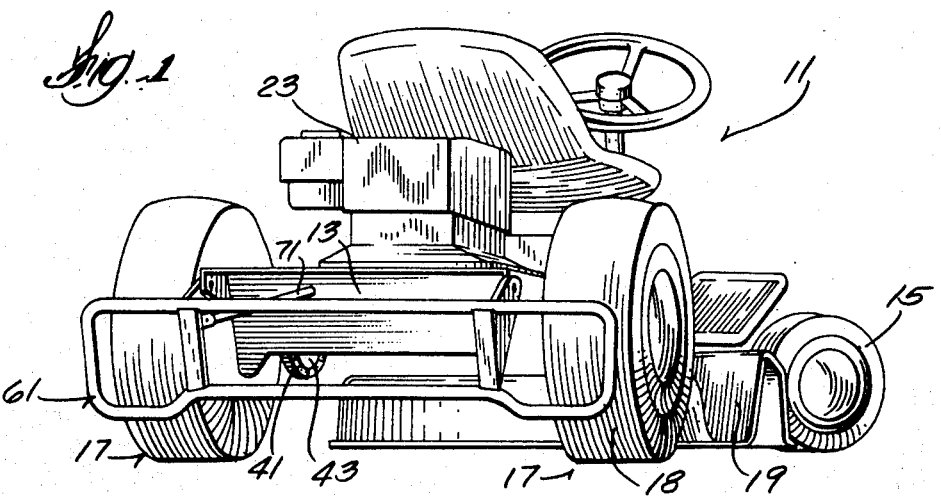
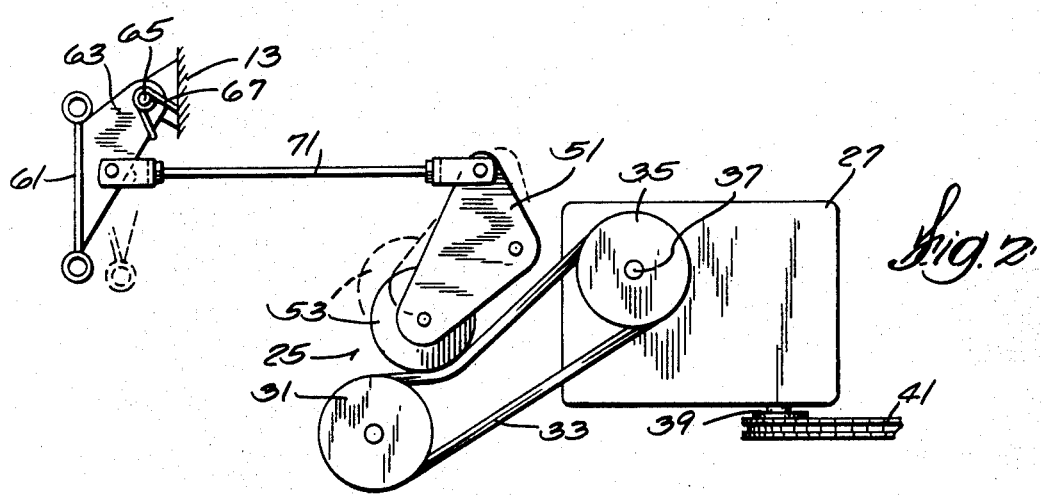
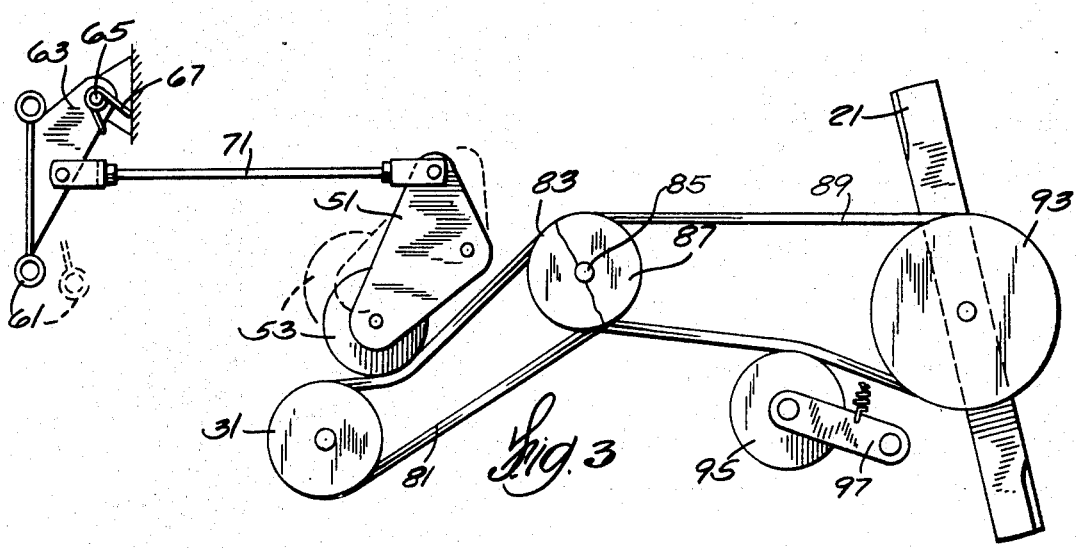

REAR SAFETY BUMPER FOR RIDER MOWERS

BACKGROUND OF THE INVENTION

The invention relates generally to lawn mowers and more particularly, to riding lawn mowers. Prior riding lawn mowers have commonly included V belt drives connecting an engine to a gear box which, in turn, was connected to a driving wheel or wheels. In addition, prior riding lawn mowers have commonly included a V belt drive from the engine to the cutter blade, which V belt drive may or may not have been integrated with the drive to the gear box.

SUMMARY OF THE INVENTION

The invention provides a riding lawn mower including a bumper movably supported on the frame thereof rearwardly of a rear wheel for movement between an extended position and a retracted position, together with power transmission means connecting an engine to a cutter blade and including a member movable relative to a first position permitting engagement of the transmission and to a second position affording disengagement of the transmission, and means connecting the bumper to the member so as to locate the member in the first position permitting engagement of the transmission when the bumper is in the extended position and in the second position to afford disengagement of the transmission when the bumper is in the retracted position.

The invention also provides means for biasing of the bumper toward the extended position.

The power transmission means can comprise an endless belt and the member can comprise an idler pulley movable relative to the endless belt between a position removing slack so as to effect power transmission and a second position permitting slack so as to interrupt power transmission.

One of the principal features of the invention is the provision in a riding lawn mower of mechanism for discontinuing rearward motion and/or cutter blade rotation in response to striking of an obstacle or object located rearwardly of the lawn mower.

Another of the principal features of the invention is the provision of a riding lawn mower which includes the mechanism referred to in the preceding paragraph and which is economical to construct and reliable in operation.

Other objects and advantages of the invention will become known by reference to the following description and claims and accompanying drawings.

DRAWINGS

FIG. 1 is a perspective view of a riding lawn mower embodying various of the features of the invention.

FIG. 2 is a schematic view of one embodiment of an operating mechanism which can be incorporated in the riding mower shown in FIG. 1.

FIG. 3 is a schematic view of another embodiment of an operating mechanism which can be incorporated in the riding mower shown in FIG. 1.

Before explaining the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Illustrated in FIG. 1 is a riding lawn mower 11 including a suitable frame 13 supported above the ground by front wheel means 15 and by rear wheel means 17 including one or more rear wheels 18. Any suitable frame and wheel arrangement can be employed.

Also supported by the frame 13 is a blade housing 19 in which a cutter blade 21 is rotatable (See FIG. 3). Also mounted on the frame 13 is an engine or motor 23 of any desired construction.

Also included in the riding lawn mower 11 is a power transmission 25 for drivingly connecting the engine 23 to the cutter blade 21 and for drivingly connecting the engine 23 to a gear box 27 (See FIG. 2) from which one or more of the wheels is rotated to propel the mower 11 over the ground.

While other transmission means could be used, it is common to employ belt drives including a pair of pulleys connected by the belt. Thus as shown in FIGS. 2 and 3, the engine 23 includes an output pulley 31 around which is trained an endless belt 33 which is also trained around another pulley 35. In FIG. 2, the pulley 35 is mounted on the input shaft 37 of the gear box 27 which includes an output sprocket 39 adapted to be connected by a chain 41 to a sprocket 43 driving one of the rear wheels.

The power transmission 25 also includes a member 51 movable between a first position engaging the transmission so as to effect delivery of power between the pulleys 31 and 35 and a second position which is spaced from the first position and which affords disengagement of the transmission 25. While other particular arrangements could be employed, in the illustrated construction, the member 51 comprises a bracket which is pivotally mounted from the frame 13 and which carries an idler wheel 53 operative to remove slack from the belt 33 and thereby cause driving engagement of the transmission when the member or bracket 51 is in the first position and to permit slack in the belt 33 when the member or bracket 51 is in the second position and thereby disengage the transmission 25. The bracket or member 51 can be manually pivoted (by means not shown) so as to manually engage and disengage the transmission 25.

In accordance with the invention, there is mounted on the frame 13 rearwardly of the rear wheel means 17 a bumper 61 which is movable between an extended position and a retracted position. Any suitable bumper construction can be employed. While other mounting arrangements could be employed, in the illustrated construction, the bumper 61 includes a bracket 63 which is pivoted at 65 to the frame 13.

Preferably, the bumper 61 is biased toward the extended position. Any suitable biasing means can be employed. In the illustrated construction a spring 67 is employed around the pivot 65 with one end bearing against the frame 13 and the other end bearing against the bracket 63 to yieldably urge the bumper 61 to the extended position.

Also in accordance with the invention, means are provided for connecting the bumper 61 to the member or bracket 51 so as to locate the member or bracket 51 in the first or transmission engaging position when the bumper 61 is in the extended position and to locate the member or bracket 51 in the second or transmission disengaging position when the bumper 61 is in the retracted position. While other connecting means could be employed, in the illustrated construction, such means comprises a connecting rod or link 71 which is pivotally connected at its ends to the bumper bracket 63 and to the bracket or member 51.

If desired, a braking system (not shown) can be associated with the belt or other driven rotary component and operable in response to movement of the member or bracket 51 to the second position so as to brake continued belt movement or component rotation upon disengagement of the drive.

In operation, when the riding lawn mower 11 engages an obstacle at the rear of the mower when moving in reverse, the bumper 61 will move from the extended position to the retracted position pivoting the bracket 63 and thereby displacing the connecting rod or link 71 to pivot the member or bracket 51 from the transmission engaging position to the transmission disengaging position and so as thereby to prevent further drive to the pulley 35. As in the FIG. 2 construction, the pulley 35 constitutes the input to the gear box 27 which is connected through the sprocket 39 to one of the wheels, such action prevents further rearward movement of the riding lawn mower 11.

Shown in FIG. 3 is another embodiment in which engine pulley 31 is connected by a belt 81 to a pulley 83 which is carried on a shaft 85 which could constitute an input shaft to a gear box such as the gear box 27. Also carried by the shaft 85 for common rotation with the pulley 83 is a second pulley 87 which, in turn, is connected by another belt 89 to still another pulley 93 which rotates in common with the cutter blade 21. As in the embodiment shown in FIG. 2, there is provided an idler wheel 53 which is connected to the bumper 61 by a link 71 and which is operable to regulate power transmission between the engine output pulley 31 and the pulley 83 in the same manner as disclosed in FIG. 2. Thus, whenever the lawn mower bumper 61 engages an obstacle when moving rearwardly, drive to the cutter blade 21 is interrupted. As in the embodiment shown in FIG. 2, a suitable brake means can be employed in connection with the cutter blade 21 to effect immediate cessation of rotation upon disengagement of drive.

The slack can be selectively removed from the belt 89 so as to provide for engagement and disengagement and consequent selective transmission of power between the pulleys 87 and 93 by an idler 95 carried by an arm 97 mounted from the frame 13. The arm 97 can be manually operated to control transmission of power from the engine 23 to the cutter blade 21 independently of power delivery to the wheel means. If desired, the connecting rod or link 71 could be connected to the arm 97 supporting the cutter blade idler 95 independently of the idler 53. However, it is preferred to connect the bumper 61 to the idler 53 as shown in FIG. 2 so as to prevent further driving of the mower 11 and to simultaneously prevent further rotation of the cutter blade 21 upon impact against an obstacle located rearwardly of the riding lawn mower.

Various of the features of the invention are set forth in the following claims.

What is claimed is:

1. A riding lawn mower comprising a frame, forward and rear wheel means mounted on said frame for engagement with the ground to support said frame above the ground, a bumper, means on said frame movably supporting said bumper rearwardly of said rear wheel means for movement between an extended position and a retracted position, an engine supported by said frame, a cutter blade carried by said frame for rotary movement relative thereto, power transmission means connecting said engine to said cutter blade and including a member movable relative to a first position permitting engagement of said transmission and to a second position affording disengagement of said transmission, and means connecting said bumper to said member so as to locate said member in said first position permitting engagement of said transmission when said bumper is in said extended position and in said second position to afford disengagement of said transmission when said bumper is in said retracted position.

2. A riding lawn mower in accordance with claim 1 and further including means biasing said bumper toward said extended position.

3. A riding lawn mower in accordance with claim 1 wherein said power transmission means comprises an endless belt and said member comprises an idler pulley movable relative to said endless belt between a position removing slack so as to effect power transmission and a second position permitting slack so as to interrupt power transmission.

4. A riding lawn mower comprising a frame, forward and rear wheel means mounted on said frame for engagement with the ground to support said frame above the ground, a bumper, means on said frame movably supporting said bumper rearwardly of said rear wheel means for movement between an extended position and a retracted position, an engine supported by said frame, a cutter blade carried by said frame for rotary movement relative thereto, power transmission means for selectively drivingly connecting and disconnecting said engine to said cutter blade, and means connecting said bumper to said power transmission means so as to permit driving connection of said engine to said cutter blade when said bumper is in said extended position and so as to effect disconnection of said engine from said cutter blade when said bumper is in said retracted position.

5. A riding lawn mower in accordance with claim 4 and further including a drive wheel and wherein said power transmission means is also selectively operable to drivingly connect and disconnect said engine to said drive wheel and wherein said means connecting said bumper to said power transmission means is also operable to permit driving connection of said engine to said drive wheel when said bumper is in said extended position and so as to effect disconnection of said engine from said drive wheel when said bumper is in said retracted position.

6. A riding lawn mower in accordance with claim 1 and further including a drive wheel and wherein said power transmission means is operable to connect said engine to said drive wheel when said member is in said first position, and to disconnect said engine from said drive wheel when said member is in said second position.

* * * * *